United States Patent [19]
Lemus et al.

[11] Patent Number: 6,111,676
[45] Date of Patent: Aug. 29, 2000

[54] WAVELENGTH SPECIFIC OPTICAL REFLECTION METER/LOCATOR IN SIGNATURED WAVELENGTH DIVISION MULTIPLEXED SYSTEMS

[75] Inventors: Avid Lemus; James Harley; Marc Veilleux, all of Ottawa, Canada

[73] Assignee: Nortel Networks Corporation, Montreal, Canada

[21] Appl. No.: 09/030,898

[22] Filed: Feb. 26, 1998

[51] Int. Cl.[7] .......................... H04B 10/02; H04B 10/08
[52] U.S. Cl. ......................... 359/124; 359/177; 359/110
[58] Field of Search .......................... 359/110, 169–170, 359/143, 187, 177, 162, 124

[56] References Cited

U.S. PATENT DOCUMENTS

| | | | |
|---|---|---|---|
| 5,513,029 | 4/1996 | Roberts | 359/177 |
| 5,654,816 | 8/1997 | Fishman | 359/177 |
| 5,699,081 | 12/1997 | Denkin et al. | 359/341 |
| 5,859,716 | 6/1999 | O'Sullivan et al. | 359/110 |

Primary Examiner—Jason Chan
Assistant Examiner—Dalzid Singh
Attorney, Agent, or Firm—Aprilia U. Diaconescu

[57] ABSTRACT

In WDM systems, each wavelength travels over a different optical paths, thus having different reflections within the path. This method for detecting reflections in bidirectional multichannel communication systems uses a unique signature attached to each signal. This allows to isolate reflections within each optical path, by measuring the optical power of a signal and of the reflection, by measuring the power of the signal and the power of the reflection. The location of the reflection is determined by calculating the relative delay between the signal and the respective reflection.

11 Claims, 2 Drawing Sheets

6,111,676

WAVELENGTH SPECIFIC OPTICAL REFLECTION METER/LOCATOR IN SIGNATURED WAVELENGTH DIVISION MULTIPLEXED SYSTEMS

BACKGROUND OF THE INVENTION

1. Field of the Invention

This invention is directed to an apparatus and method for detecting reflections, and in particular to a wavelength specific optical reflection meter/locator for WDM (wavelength division multiplexed) systems.

2. Background Art

In optical amplified systems, the reflection of a significant portion of the light leaving via a given fiber may cause problems with detection of the loss of the input signal on that fiber. If the reflected outgoing light could be distinguished from the desired input signal, then appropriate alarms or control actions could be initiated. The outgoing light, that is then reflected, could be amplified signal and amplified spontaneous emission (ASE), as in the case of a bi-directional system, or could be just ASE, as in the case of a unidirectional system. Or, the outgoing light could be a combination of signals and ASE from both directions in the case where there are more complex optical path reflections.

Especially in multi-channel bi-directional optical system, reflections can cause optical amplifiers to oscillate, despite the optical isolators that may be present. This oscillation path can involve more than one optical amplifier in the system and be quite complex. The detection of reflections is important in that it helps to prevent oscillations in bidirectional optical amplifiers, as also it provides the power of the signal propagating in the direction of the reflection. Moreover, in multi-channel systems, where signals of different wavelengths travel in different optical paths, the reflections are also different for each optical path. Location of the main source of a particular reflection is also desirable for trouble-shooting purposes.

Measurement of the strength of reflections is presently done with an optical time domain reflectometer (OTDR) that sends strong short pulses of light down a fiber and measures the signal returned. This is an accurate method, but the OTDR is a relatively large and expensive piece of test equipment that can not easily be used when there is traffic on the fiber.

Optical frequency domain reflectometry (OFDR) may also be used to detect faults in an optical link. According to this method, the optical frequency is varied and optically coherent detection is used, or an optical source is modulated with a constant amplitude tone that is swept in frequency.

Reflections may be detected by modulating the laser pump of an optical amplifier in the optical path of interest, which modulates all signals output by that particular amplifier, as disclosed in the U.S. patent application Ser. No. 08/588,176 (O'Sullivan et al.), filed on Jan. 18, 1996 and assigned to Northern Telecom Limited. The dither method requires controlling the dither at each amplifier site, and has no consideration of the wavelength dependency of the reflection.

Still another prior art method is to measure the amount of DC light reflected back via a four port coupler. However, this method does not stimulate or consider the AC portion of the signals, and also does not provide for locating the fault. The DC reflection is used to determine if a large reflection from a broken fiber or open connector is present at the output of a network element, such as an optical amplifier, so as to shutdown the output of the faulty network element for safety. In addition, this has been known to falsely trigger from low level reflection due to Raleigh scattering in the fiber. In addition, this method cannot be used in bidirectional systems.

The prior art generally fails to provide a method for easy and accurate detection of reflections in optical systems, and for distinguishing between equipment failures and lack of an input signal.

There is a need to distinguish optical reflections from valid inputs when isolating a cable break in a bidirectional WDM optically amplified system.

SUMMARY OF THE INVENTION

It is an object of this invention to calculate the per-wavelength reflection, without using expensive fixed or tracking optical filters. In a WDM environment, it is more appropriate to measure the reflections for each wavelength. This will enable accurate calculation of the power of the information signal and that of the reflection propagating within the same channel.

It is another object of the invention to determine the main location of the reflection by detecting the relative delay of the reflected signal to the outgoing signal. The location of the reflection can be calculated using the time to distance relationship for the carrier signal travelling in the fiber medium.

It is still another object of the invention to measure the reflections using a signature pattern inserted in the optical domain which uniquely identifies each optical signal, and detects it with either fixed analog filtering, or digital filtering and processing.

Accordingly, the invention is directed to a method for detecting a reflection of an optical signal travelling in a forward direction over a span of transmission medium, the optical signal including a signature bit pattern, the power of the signature bit pattern being in a predetermined ratio (m) with the power of the optical signal, comprising the steps of, at a point of interest, diverting a forward fraction of the optical signal and a reverse fraction of the reflection, if any; measuring the power of the signature bit pattern in the forward fraction and in the reverse fraction; determining the optical power of the optical signal and the reflected power of the reflection, and calculating the return loss value for the optical signal as the ratio between the reflected power and the optical power.

The invention further includes a method for detecting per-wavelength reflections of a multi-channel bidirectional optical signal S travelling on a span of transmission medium, comprising the steps of, providing each component $S_i$ of the multi-channel bidirectional signal with a distinct signature bit pattern $s_{BPi}$, the power of the signature bit pattern being in a predetermined ratio m with the power of the optical signal $S_i$; at a point of interest, diverting a forward fraction of all forward components of the optical signal S and a reverse fraction of all reverse components of the optical signal S, for a forward component of interest $S_j$ on channel $I_j$, measuring the optical power $P_j$ of the forward component $S_j$ in the forward fraction, measuring the reflected power $P_j'$ for the component of interest in the reverse fraction, and calculating the return loss value for the component of interest $S_j$ as the ratio between the reflected power $P_j'$ and the optical power $P_j$.

The advantage of this invention over the pump modulation set-up is that the dither needs only be inserted once, at the signal source, by either inserting a unique signature pattern in the bit-stream, or amplitude modulating the carrier with a signature pattern. Any other devices in the signal path can calculate the output power and reflected power for the same signal, using the detected signature. This process can be repeated for each signal present, and hence the reflection from each wavelength can be calculated.

BRIEF DESCRIPTION OF THE DRAWINGS

The foregoing and other objects, features and advantages of the invention will be apparent from the following more particular description of the preferred embodiments, as illustrated in the appended drawings, where.

DESCRIPTION OF THE PREFERRED EMBODIMENT

The term 'return loss value' is defined in this application as the ratio of output power for a specific carrier to the reflected power for the same carrier.

Figure 1:
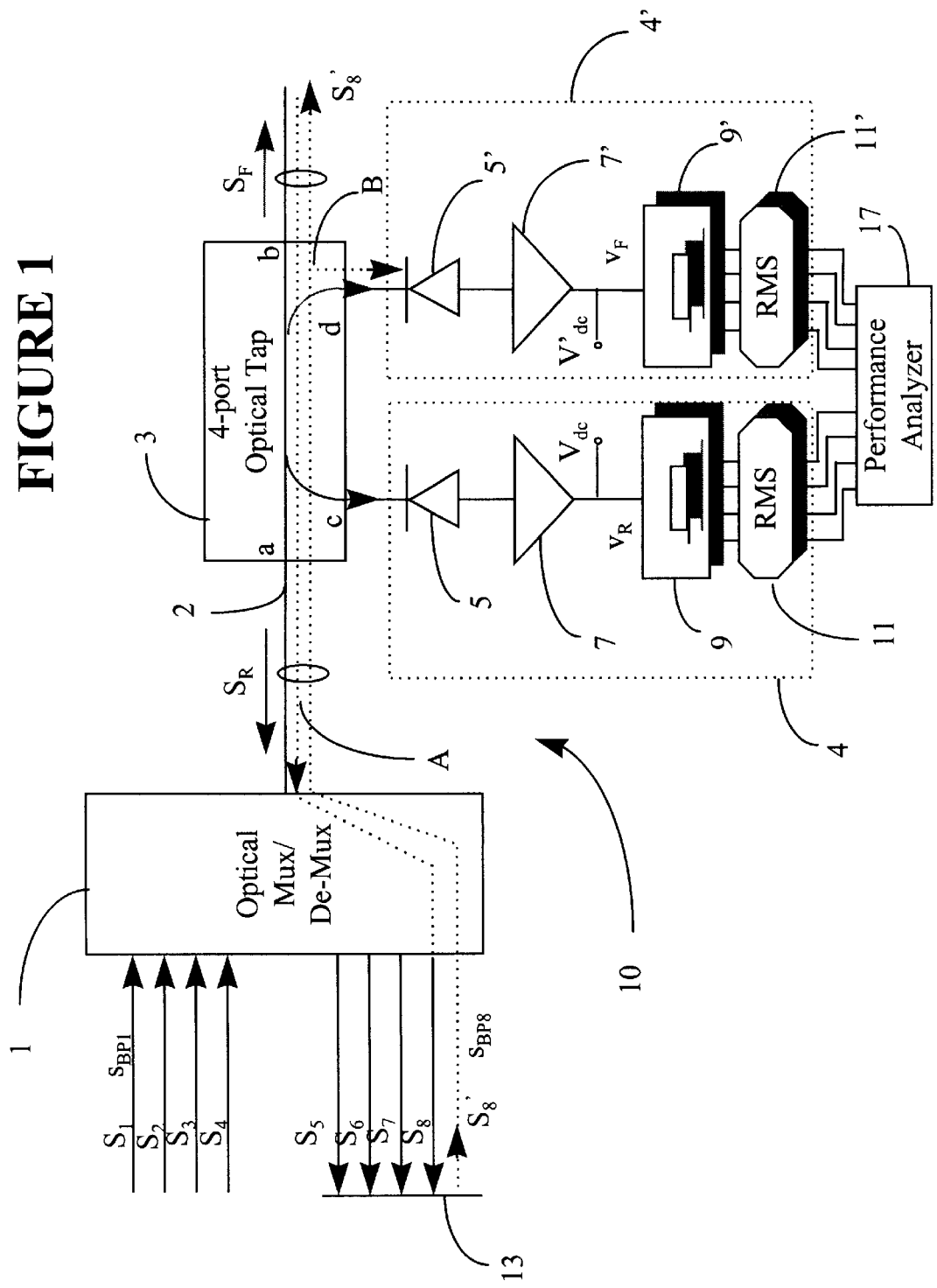
FIG. 1 illustrates a block diagram of a multi-channel bidirectional span with the set-up for measuring and locating reflections.

FIG. 1 represents an application of the invention and the key elements required. A span of an eight-channel transmission system 10 is illustrated in FIG. 1 by way of example only, the invention may be equally applied to systems having more or less channels.

In this example, signals $S_1$–$S_4$ travel from West to East and signals $S_5$–$S_8$ travel from East to West. The term 'forward direction' is also used herein to designate the East direction, namely channels $\lambda_1$–$\lambda_4$, and the term 'reverse direction' is used also for the West direction, namely channels $\lambda_5$–$\lambda_8$. It is to be understood that the terms 'forward' and 'reverse' are of a broader scope, and that they are used to designate opposed direction of transmission of any bi-directional system.

A unique signature bit pattern is inserted in each optical signal, where the rms (root mean square) of the signature bit pattern has inherently a fixed ratio to the optical power of that signal. Detecting the rms of this signature bit pattern means that the optical power of the optical signal can be determined knowing the ratio.

Similarly, the optical power of the optical signals co-propagating along the same fiber span may be detected at the same time, when each optical signal is given a unique signature pattern. The signature bit pattern for each co-propagating signal is designed to be detected independently from each other. A method for detecting the power of an optical signal using a signature bit pattern in optical WDM systems is disclosed in the co-pending U.S. patent application Ser. No. 08/986,027, filed on Dec. 5, 1997, by Harley et al, entitled "Optical Signal Power Detection With Signature Bit Pattern In WDM Systems", and assigned to Northern Telecom Limited.

An optical multiplexer/demultiplexer (Mux/Demux) 1 multiplexes forward signals $S_1$–$S_4$ into a forward multi-channel signal $S_F$, which is launched on fiber 2, and demultiplexes a reverse multi-channel signal $S_R$ received on fiber 2, into reverse signals $S_5$–$S_8$. While the power of signals $S_1$–$S_8$ is equalized at the respective transmitter sides, it inherently becomes different as the signal travels along the optical path, since each path has its different characteristics. As such, signals $S_1$–$S_8$ are characterized by a respective power $P_1$–$P_8$ at the input, and respectively output, of Mux/Demux 1. The power is measured as per the above identified U.S. patent application, and as it is described next for signal $S_1$.

A signature bit pattern shown at $s_{BP1}$, is inserted into the frame of optical signal $S_1$. If we note the average optical power of $S_1$ with $P_1$, the average optical power of $s_{BP1}$ with $P_{BP1}$, and the ratio between the powers of $s_{BP1}$ and $S_1$ with m, we have the following relationship:

$$m = P_{BP1}/P_1 \text{ or, } P_{BP1} = m \times P_1 \tag{1}$$

A measurement unit 4 for the reverse direction and a measurement unit 4' for the forward direction are connected on the fiber 2 at a point of measurement (POM), using a four-port optical tap 3. Four-port optical tap 3 diverts a fraction (generally 3%) of the forward multi-channel signal $S_F$ and the reverse multi-channel signal $S_R$ for measurement of the power of each signal $S_1$–$S_8$.

The optical signal $S_1$ with the signature bit pattern is carried by channel $\lambda_1$ on fiber 2 to four-port optical tap 3, along with signals $S_2$–$S_4$. The input and output ports of the optical tap 3 are denoted with a and b, respectively, and the ports where the tapped fractions are collected, are denoted with c and respectively d.

The tapped fraction collected for signal $S_R$ at port d is converted to an electrical signal using an optical-to-electrical (O/E) converter 5', which is in general a PIN diode, and then amplified by transimpedance amplifier 7'.

The electrical signal $v_F$ at the output of transimpedance amplifier 7' comprises an ac and a dc component. The dc voltage $V'_{dc}$ is a linear combination of the individual optical signal powers:

$$V'_{dc} = a \times P_1 + b \times P_2 + c \times P_3 + I \times P_I \tag{2}$$

where a, b, ... i are known calibration constants for the respective transmission channel, and $P_1$–$P_I$ are the optical powers of the respective optical signals $S_1$–$S_I$, where I is the number of channels on span 2, which is 8 in the example of FIG. 1. It is to be understood that without reflection, $V'_{dc}$ depends on the power $P_1$–$P_4$ of the forward channels only.

Signal $v_F$ is filtered in a band pass filter 9' for extracting the component frequencies of, for example, the signature bit pattern $s_{BP1}$. A signature rms detector 11' detects the '$rms_1$' of $S_{BP1}$ independent from the interferences from the co-propagating optical signals.

At the frequency of interest $\lambda_1$, and in the absence of any reflection, the power of the signature bit patterns for the other channels $\lambda_2$ to $\lambda_4$ is practically zero, so that the measured $rms_1$ gives $P_{BP1}$ using the relation:

$$P_{BP1} = rms_1/a \tag{3}$$

where a is the calibration constant for channel $\lambda_1$, known. The value of $P_1$ can now be determined knowing m, which gives:

$$P_1 = rms_1/m \times a \tag{4}$$

In a similar way, if the other signals $S_2$–$S_8$ have their own unique signature pattern, or analog dither, and the optical power of these signals can be determined in the same way, as long as all the signal dithers are designed to be independently detected from each other, for example they are frequency division multiplexed.

According to this invention, reflections affecting, for example, reverse optical signal $S_8$, are determined by first measuring the power of the signature $s_{BP8}$ in $S_R$. To this end, a fraction of $S_R$, and thus of $S_8$, is tapped with four-port tap 3, the fraction is collected at port c, and input to measurement unit 4. Here, $S_R$ is converted to an electrical signal using an O/E converter 5, and a transimpedance amplifier 7. Next, the power of $S_8$ is measured using a band-pass filter 9 and an rms signature detector 11. Reverse signal $S_8$ then travels a particular path from tap 3 to Mux/Demux 1, shown as A. Let's say that this signal experiences a reflection, which is specific to both its wavelength and path, as shown by obstacle 13. The reflected signal $S_8'$ travels back along a forward (Eastbound) path shown by B. Tap 3 diverts a fraction of this reflected signal on output d, and the power of the reflected signal $S_8'$ and the return loss is determined based on the signature pattern for signal $S_8$, with measurement unit 4'. The return loss measurement for this channel and for all channels can then be determined.

The location of the reflection, i.e. the fiber breaks or bad connections can be easily determined using a performance analyzer 17 by first calculating the delay $DT_8$ between $S_8$ and $S_8'$. If signal $S_R$ comprises a single tone, the location is proportional to the phase shift. The measurement is effected for all I signals travelling along fiber 2.

In FIG. 1, O/E detector 5, transimpedance amplifier 7, filter 9 and rms detector 11 are shown as part of a measurement unit 4, while O/E detector 5', transimpedance amplifier 7', filter 9' and rms detector 11' are shown as part of measurement unit 4'. However, in many cases some of these units, tap 3 or performance analyzer 17 may already be provided at the point of measurement for other reasons, and they can be readily adapted to perform the operation according to the present invention.

Figure 2:
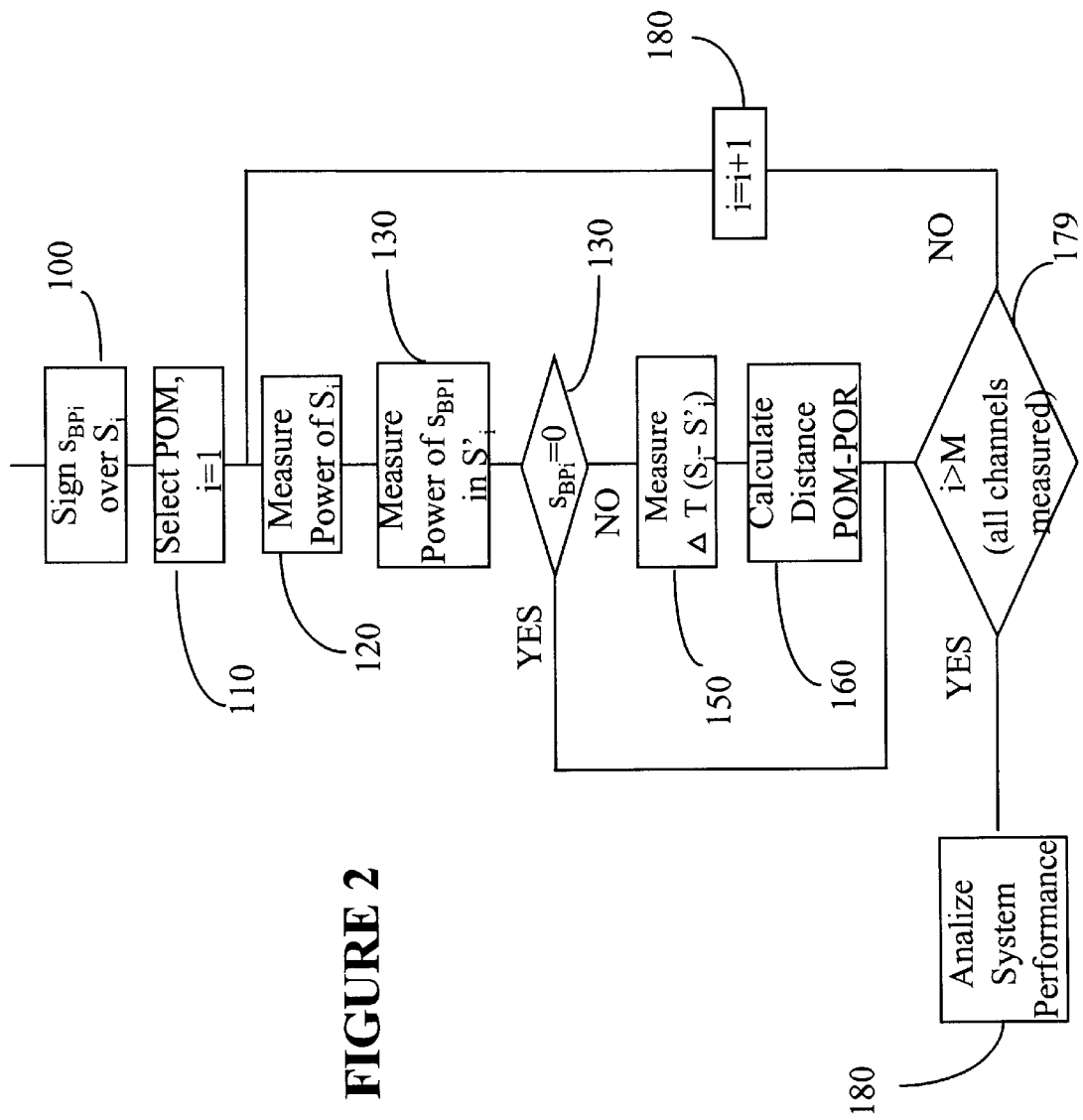
FIG. 2 is a flow-chart of the method according to the invention.

FIG. 2 is a flow chart of the method according to this invention for a system with I channels, where I is an integer and includes the channels in both the forward and reverse direction.

In the first step 100, the signature $s_{BPi}$ for each channel $2_i$ is inserted on the respective channel, over the respective information signal $S_i$. As indicated above, the ratio between $s_{BPi}$ and $S_i$ is a known constant m.

A point of measurement (POM) is selected in step 110, and the optical tap 3 is connected on fiber span 2 in the POM, for diverting a fraction of the forward and reverse signals for measurement of power and reflections. Next, the power of a forward channel $S_i$ is measured in step 120, and the power of a reflected signal $S_i'$ is measured in step 130, using the respective measurement units 4 and 4'. If no reflection $S_i'$ is detected for signal $S_1$, as shown in step 140, the next channel is processed, as shown by steps 170 and 180.

If there is a reflection on channel $I_i$, shown by the NO branch of block 140, the location of the reflection is determined by calculating the delay $DT_i$ between the two signals using performance analyzer 17, shown in steps 150 and 160.

The above steps 120–180 are repeated for all I channels of the respective WDM system, as shown by blocks 170 and 180, and a system performance analysis is next effected by performance analyser 17, shown in step 190.

In this way, the reflection from each wavelength can be calculated, as well the power of each channel and the location of the reflection.

We claim:

1. A method for detecting a reflection of an optical signal travelling in a forward direction over a span of a WDM communication system, said optical signal including a signature bit pattern provided in Predetermined timeslots of the frame of said optical signal, and having the power in a predetermined ratio (m) with the power of said optical signal, comprising the steps of:

at any point of interest along said span, diverting a forward fraction of said optical signal and a reverse fraction of said reflection, if any;

measuring the power of said signature bit pattern in said forward fraction and in said reverse fraction;

determining the optical power of said optical signal and the reflected power of said reflection; and calculating the return loss value for said optical signal as the ratio between the reflected power and the optical power of said optical signal.

2. A method as claimed in claim 1, further comprising declaring a fault whenever the reflected power of said optical signal is greater than a threshold.

3. A method for detecting per-wavelength reflections of a multi-channel bi-directional optical signal S travelling on a span of a WDM communication system, comprising the steps of:

providing each component $S_i$ of said multi-channel bi-directional signal with a distinct signature bit pattern $s_{BPi}$, the power of said signature bit pattern being in a predetermined ratio m with the power of said optical signal $S_i$;

at a point of interest, diverting a forward fraction of all forward components of said optical signal S and a reverse fraction of all reverse components of said optical signal S, if any;

for a forward component of interest $S_j$ on channel $\lambda_j$, measuring the optical power $P_j$ of said forward component $S_j$ in said forward fraction;

measuring the reflected power $P_j'$ for said component of interest in said reverse fraction; and calculating the return loss value for said component of interest $S_j$ as the ratio between said reflected power $P_j'$ and said optical power $P_j$.

4. A method as claimed in claim 3, wherein said signature bit pattern $s_{BPi}$ is unique to said span.

5. A method as claimed in claim 3, wherein said step of measuring the optical power $P_j$ comprises:

converting said forward fraction into a forward electrical signal;

separating and measuring a forward dc component of said forward electrical signal, said dc component being indicative of the weighted sum of the power of all said forward components;

measuring the optical power $P_{BPj}$ of said signature bit pattern $s_{BPj}$ in said forward dc component;

determining the optical power $P_j$ of said forward component from said forward dc component and the optical power $P_{BPj}$.

6. A method as claimed in claim 3, wherein said step of measuring the reflected power $P_j'$ comprises:

converting said reverse fraction into a reverse electrical signal; and measuring the optical power $P_j'$ of said signature bit pattern $s_{BPj}$ in said reverse electrical signal.

7. A method as claimed in claim 6, wherein said steps of measuring the optical power $P_{BPj}$ comprises:

filtering said reverse electrical signal to retain the harmonics having the frequencies of said signature bit pattern $s_{BPj}$; and measuring the root mean square $rms'_{SB1}$ of said harmonics.

8. A method as claimed in claim 5, wherein said steps of measuring the optical power $P_{BPj}$ comprises:

filtering said forward electrical signal to retain the harmonics having the frequencies of said signature bit pattern $s_{BPj}$; and measuring the root mean square $rms_{SB1}$ of said harmonics.

9. A method as claimed in claim 8, wherein measuring the root mean square $rms_{SB1}$ is performed with a analog filter with peak detect circuitry.

10. A method as claimed in claim 8, wherein said step of measuring the root mean square $rms_{SB1}$ comprises a digital matched filter detection.

11. A method as claimed in claim 10, wherein said digital matched filter detection is performed with a super Nyquist sampling analog-to-digital converter and a digital signal processing unit.

* * * * *